(12) United States Patent
Toda et al.

(10) Patent No.: US 10,280,816 B2
(45) Date of Patent: May 7, 2019

(54) VALVE TIMING ADJUSTMENT DEVICE

(71) Applicants: DENSO CORPORATION, Kariya, Aichi-pref. (JP); SOKEN, INC., Nishio, Aichi-pref. (JP)

(72) Inventors: Shota Toda, Nishio (JP); Makoto Otsubo, Nishio (JP); Hiroki Takahashi, Kariya (JP)

(73) Assignees: DENSO CORPORATION, Kariya (JP); SOKEN, INC., Nishio (JP)

( * ) Notice: Subject to any disclaimer, the term of this patent is extended or adjusted under 35 U.S.C. 154(b) by 82 days.

(21) Appl. No.: 15/552,375

(22) PCT Filed: Apr. 21, 2016

(86) PCT No.: PCT/JP2016/002126
§ 371 (c)(1),
(2) Date: Aug. 21, 2017

(87) PCT Pub. No.: WO2016/208105
PCT Pub. Date: Dec. 29, 2016

(65) Prior Publication Data
US 2018/0038246 A1 Feb. 8, 2018

(30) Foreign Application Priority Data
Jun. 23, 2015 (JP) .................. 2015-125902

(51) Int. Cl.
*F01L 1/352* (2006.01)
*F16H 1/32* (2006.01)

(52) U.S. Cl.
CPC ....... *F01L 1/352* (2013.01); *F01L 2001/3521* (2013.01); *F16H 2001/323* (2013.01); *F16H 2001/327* (2013.01)

(58) Field of Classification Search
CPC . F01L 1/352; F01L 1/344; F01L 1/356; F01L 2001/3521; F16H 2001/323; F16H 2001/327
(Continued)

(56) References Cited

U.S. PATENT DOCUMENTS

| 2008/0083388 A1* | 4/2008 | Uehama | F01L 1/352 |
| | | | 123/90.17 |
| 2009/0017952 A1* | 1/2009 | Sugiura | F01L 1/34 |
| | | | 475/128 |

(Continued)

OTHER PUBLICATIONS

International Search Report for PCT/JP2016/002126, dated Jul. 19, 2016, 4 pages.

*Primary Examiner* — Laert Dounis
*Assistant Examiner* — Kelsey L Stanek
(74) *Attorney, Agent, or Firm* — Nixon & Vanderhye P.C.

(57) ABSTRACT

A planetary rotor includes: a planetary gear engaged with a driving rotor and a driven rotor on an eccentric side; and a single sequence type planetary bearing having an outer ring held by the planetary gear, an inner ring supported by a planetary carrier in the radial direction and receiving a restoring force from an elastic component, and a plurality of spherical rolling elements interposed between the outer ring and the inner ring. The outer ring is arranged to form a rolling contact part in contact with the spherical rolling element on the eccentric side, with a contact angle to a specific side in the axial direction. A thrust-bearing part where the driving rotor is supported by the driven rotor on the specific side and on the eccentric side is located closer to a rotation center line of the driven rotor than the rolling contact part is.

5 Claims, 9 Drawing Sheets

(58) Field of Classification Search
USPC .............................. 123/90.17; 464/1, 2, 160
See application file for complete search history.

(56) References Cited

U.S. PATENT DOCUMENTS

2015/0211392 A1* 7/2015 Otsubo ................... F01L 1/352
  475/162
2016/0290181 A1* 10/2016 Otsubo ................... F01L 1/352

* cited by examiner

OPPOSITE-TO-SPECIFIC ←——→ SPECIFIC SIDE
          SIDE

VALVE TIMING ADJUSTMENT DEVICE

CROSS REFERENCE TO RELATED APPLICATION

This application is the U.S. national phase of International Application No. PCT/JP2016/002126 filed Apr. 21, 2016, which designated the U.S. and claims priority to Japanese Patent Application No. 2015-125902 filed on Jun. 23, 2015, the entire contents of each of which are hereby incorporated herein by reference.

TECHNICAL FIELD

The present disclosure relates to a valve timing adjustment device that adjusts valve timing of a valve opened and closed by a camshaft by a torque transfer from a crankshaft for an internal combustion engine.

BACKGROUND ART

A valve timing adjustment device is known, which has a driving rotor rotating with a crankshaft and a driven rotor rotating with a camshaft, and a rotation phase between the driving rotor and the driven rotor is controlled by planetary movement of a planetary rotor.

In Patent Literature 1, a driven rotor connected coaxially with a camshaft supports a driving rotor at both sides in the axial direction as a thrust bearing, and supports the driving rotor from the inner side in the radial direction as a radial bearing. A planetary rotor eccentric to the driving rotor and the driven rotor is in the gear engagement state meshing from an inner side in the radial direction on the eccentric side, thereby enabling to control the rotation phase by the planetary movement. A planetary carrier which supports the driving rotor from the inner side in the radial direction also supports the planetary rotor from the inner side in the radial direction, such that the planetary rotor can do smooth planetary movement. Accordingly, the valve timing can be suitably controlled in response to the rotation phase.

The planetary rotor of Patent Literature 1 is biased to the eccentric side relative to the driving rotor and the driven rotor, by a restoring force of an elastic component interposed between the planetary carrier and the planetary rotor. Thereby, abnormal noise caused by rattling can be reduced to improve quiet performance in each engagement part of the planetary rotor engaged with the driving rotor and the driven rotor.

PRIOR ART LITERATURES

Patent Literature

Patent Literature 1: JP 4360426 B2

SUMMARY OF INVENTION

In Patent Literature 1, abnormal noise caused by backlash can be reduced by setting the position of the engagement part of the planetary rotor engaged with the driving rotor and the driven rotor. However, as a result of the diligent study conducted by the inventors, it becomes clear that another measure is needed to abnormal noise generated by collision with the driven rotor when the driving rotor moves to both sides in the axial direction, due to a clearance existing in a thrust-bearing part of the driving rotor supported by the driven rotor.

The present disclosure aims to provide a valve timing adjustment device in which abnormal noise is restricted from being generated to improve quiet performance.

According to an aspect of the present disclosure, a valve timing adjustment device that adjusts valve timing of a valve opened and closed by a camshaft by a torque transfer from a crankshaft for an internal combustion engine, the valve timing adjustment device includes:

a driving rotor that rotates with the crankshaft;

a driven rotor that rotates with the camshaft in a state where the driven rotor supports the driving rotor at both sides in an axial direction as a thrust bearing, and where the driven rotor supports the driving rotor from an inner side in a radial direction as a radial bearing, the driven rotor being connected coaxially with the camshaft;

a planetary rotor arranged eccentric to the driving rotor and the driven rotor, the planetary rotor controlling a rotation phase between the driving rotor and the driven rotor by carrying out planetary movement under a gear engagement state in which the planetary rotor is engaged with the driving rotor and the driven rotor from an inner side in the radial direction on the eccentric side;

a planetary carrier that causes the planetary movement of the planetary rotor under a state where the driving rotor is supported from the inner side in the radial direction, and where the planetary rotor is supported from the inner side in the radial direction; and an elastic component interposed between the planetary rotor and the planetary carrier to generate a restoring force biasing the planetary rotor to the eccentric side such that the driving rotor is inclined to the driven rotor.

The planetary rotor includes: a planetary gear engaged with the driving rotor and the driven rotor on the eccentric side; and a single sequence type planetary bearing having an outer ring held by the planetary gear, an inner ring supported by the planetary carrier in the radial direction and receiving the restoring force from the elastic component, and a plurality of spherical rolling elements interposed between the outer ring and the inner ring. The outer ring is arranged to form a rolling contact part in contact with the spherical rolling element on the eccentric side, with a contact angle to a specific side in the axial direction. A thrust-bearing part where the driving rotor is supported by the driven rotor on the specific side and on the eccentric side is located closer to a rotation center line of the driven rotor than the rolling contact part is.

Accordingly, the outer ring of the single sequence type planetary bearing of the planetary rotor is held by the planetary gear engaged with the driving rotor and the driven rotor on the eccentric side. Here, the inner ring of the planetary bearing supported by the planetary carrier in the radial direction receives the restoring force from the elastic component to the eccentric side. Furthermore, while the plural spherical rolling elements are interposed between the inner ring and the outer ring, the outer ring is arranged to form a rolling contact part in contact with the spherical rolling element on the eccentric side, with a contact angle to the specific side in the axial direction.

A thrust force component of the restoring force by which the spherical rolling element presses the outer ring to the specific side in response to the contact angle causes a thrust reaction force by which the outer ring presses the spherical rolling element to the opposite-to-specific side opposite to the specific side at the rolling contact part on the eccentric side. The opposite-to-specific side thrust reaction force is transmitted from the spherical rolling element to the inner ring and the planetary carrier in this order, and acts on the driving rotor supporting the planetary carrier in the radial direction. Therefore, at the thrust-bearing part on the specific side and the eccentric side where the driving rotor is supported by the driven rotor as the thrust bearing, the driving rotor presses the driven rotor to the opposite-to-specific side, such that a thrust reaction force is generated in which the driven rotor presses the driving rotor to the specific side.

The thrust-bearing part, which is an action point of the specific side thrust reaction force, is located closer to the rotation center line of the driven rotor than the rolling contact part is, which is an action point of the opposite-to-specific side thrust reaction force. As a result, the driving rotor which receives the specific side thrust reaction force and the opposite-to-specific side thrust reaction force is inclined to the driven rotor, integrally with the inner ring of the planetary bearing and the planetary carrier. At this time, the driving rotor is inclined to increase the pressure to the driven rotor at the thrust-bearing part on the specific side and the eccentric side. This means that the driving rotor maintains the contact with the driven rotor at both sides in the axial direction by own inclination. Therefore, the driving rotor can be restricted from moving to both sides in the axial direction and from colliding with the driven rotor by this contact maintaining function due to the inclination, such that abnormal sound produced by the collision can be reduced to enhance the silence.

The thrust-bearing part may be defined by a protruding part projected in the axial direction from one of the driving rotor and the driven rotor that is in contact with the other of the driving rotor and the driven rotor. The protruding part has a tip end surface, and an outermost circumference part of the tip end surface on the eccentric side is located closer to the rotation center line of the driven rotor than the rolling contact part is.

Accordingly, the protruding part projected in the axial direction from one of the driving rotor and the driven rotor defines the thrust-bearing part by contacting with the other of the rotors. Thereby, at the thrust-bearing part on the specific side and on the eccentric side, the outermost circumference part of the protruding part is located closer to the rotation center line of the driven rotor than the rolling contact part is, such that the driving rotor can be certainly inclined, as the outermost circumference part works as a fulcrum. Therefore, the inclination can be secured for making the driving rotor to be in contact with the driven rotor at both sides in the axial direction, so as to reduce the abnormal noise. Thus, it becomes possible to certainty enhance the silence.

DESCRIPTION OF EMBODIMENTS

An embodiment is described based on the drawings.

Figure 1:
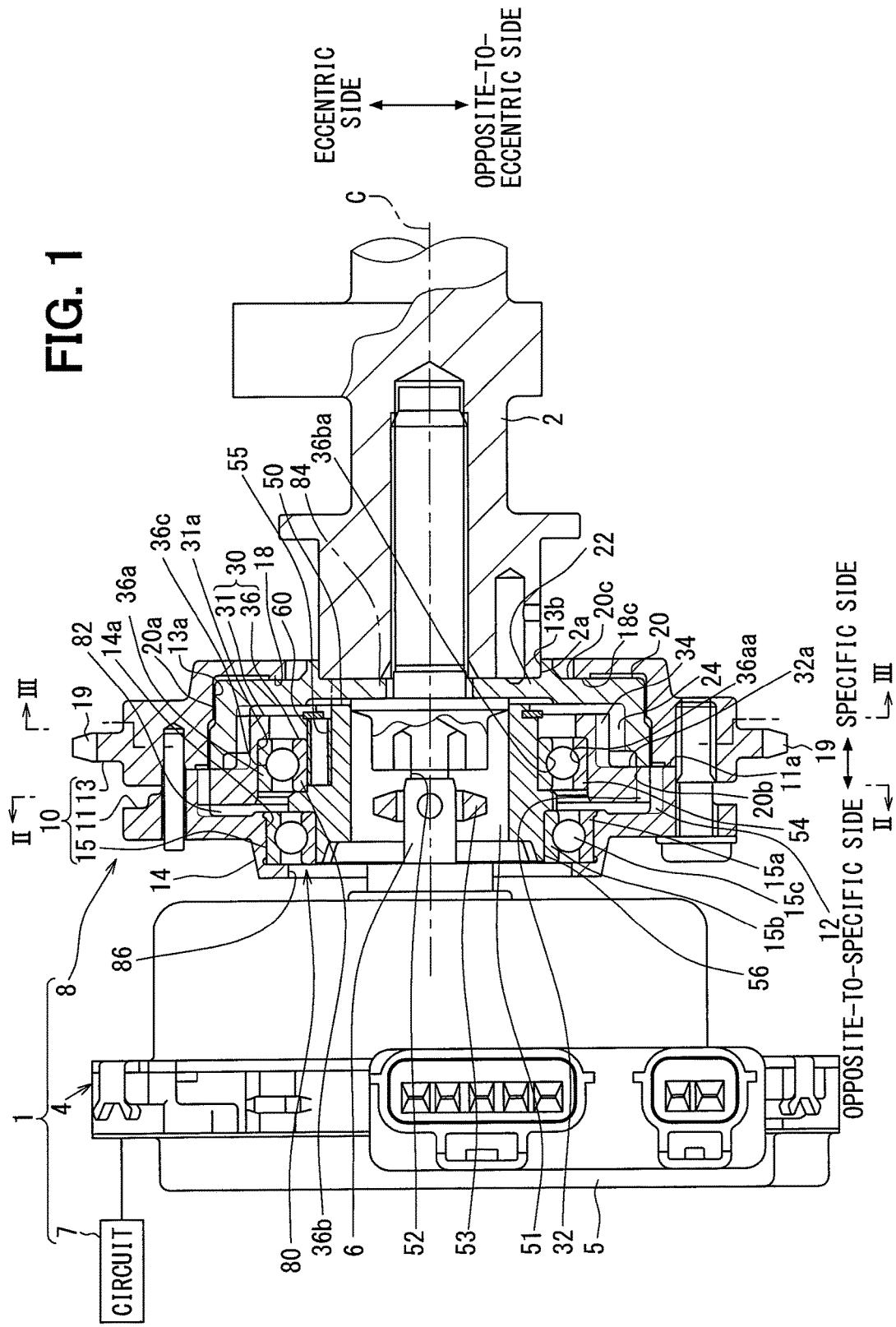
FIG. 1 is a view illustrating a valve timing adjustment device according to an embodiment, and is a cross-sectional view taken along a line I-I of FIG. 2.

As shown in FIG. 1, a valve timing adjustment device 1 according to an embodiment is attached to a transfer system which transmits crank torque to a camshaft 2 from a crankshaft (not shown) in an internal combustion engine of a vehicle. The camshaft 2 opens and closes an intake valve (not shown) corresponding to a "valve" of the internal combustion engine, using transfer of crank torque. The valve timing adjustment device 1 controls the valve timing of the intake valve.

Figure 2:
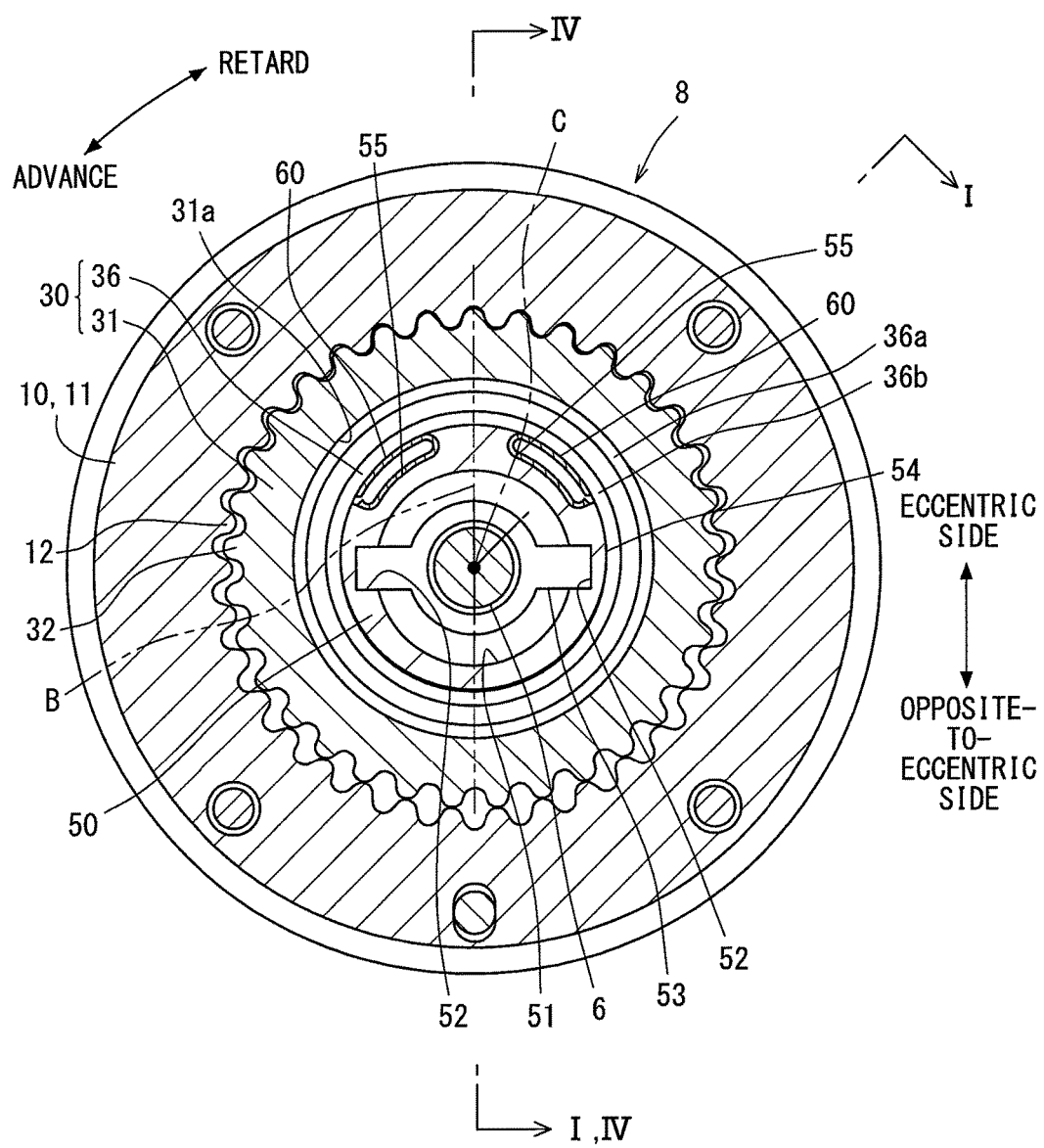
FIG. 2 is a cross-sectional view taken along a line II-II of FIG. 1.
Figure 3:
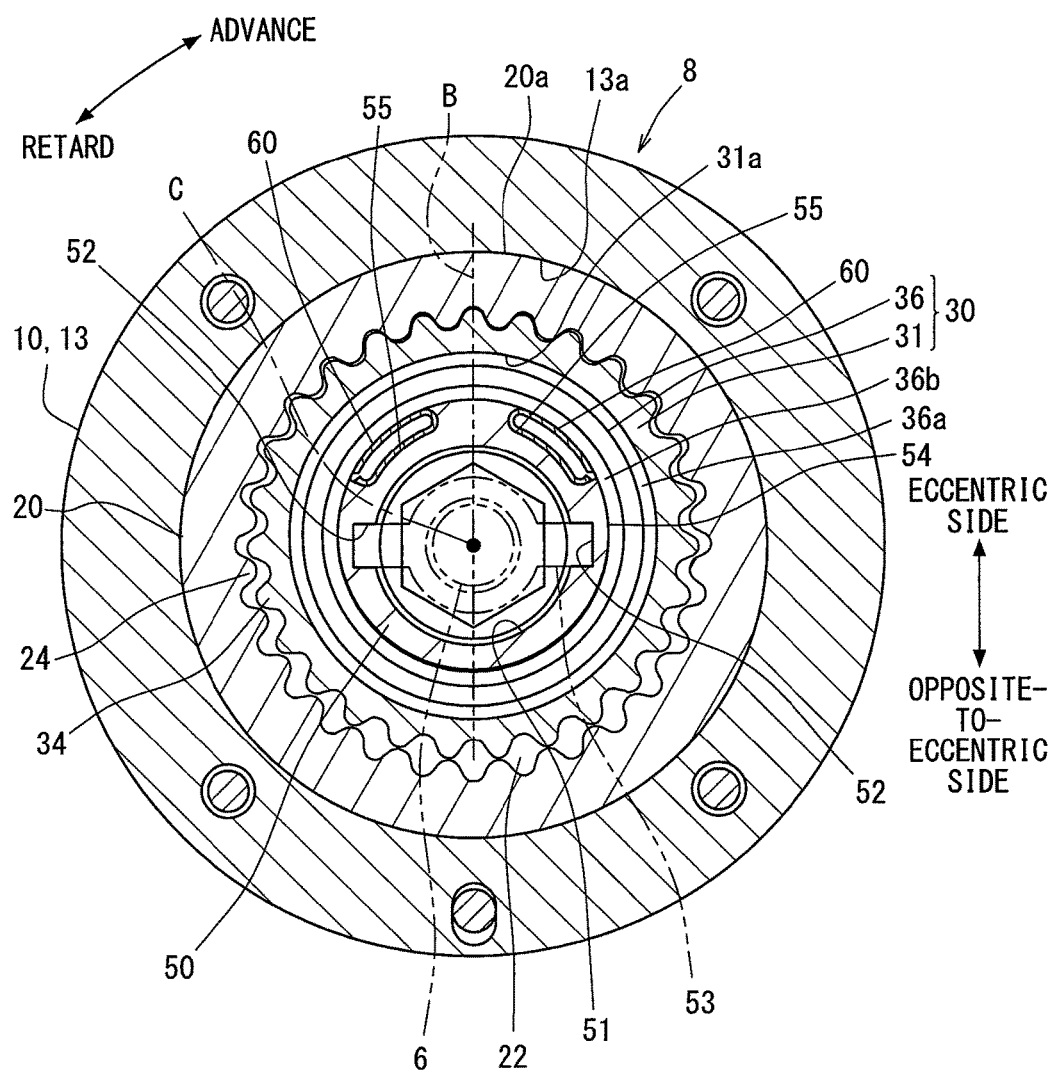
FIG. 3 is a cross-sectional view taken along a line III-III of FIG. 1.

The basic structure of the device 1 is explained. As shown in FIGS. 1-3, the device 1 includes an actuator 4, an energizing control circuit unit 7, and a phase adjustment unit 8.

The actuator 4 shown in FIG. 1 is an electric motor such as a brushless motor, and has a housing body 5 and a control shaft 6. The housing body 5 is fixed to a fix portion of the internal combustion engine, and supports the control shaft 6 in a rotatable state. The energizing control circuit unit 7 includes a drive driver and a microcomputer for control, and is arranged outside and/or inside the housing body 5. The energizing control circuit unit 7 is electrically connected to the actuator 4, and controls power supply to the actuator 4 to rotate the control shaft 6.

As shown in FIGS. 1-3, the phase adjustment unit 8 includes a driving rotor 10, a driven rotor 20, a planetary rotor 30, a planetary carrier 50, and an elastic component 60.

The driving rotor 10 is made of metal and has a hollow shape, as a whole, housing the components 20, 30, 50, and 60 of the phase adjustment unit 8 inside. As shown in FIGS. 1 and 2, the driving rotor 10 includes a sun gear 11, a sprocket 13, and a sun bearing 15.

The sun gear 11 has a cylindrical shape with a projection. The sun gear 11 has a drive side internal-gear part 12 with a tip circle on the radially inner side of a root circle at the circumference wall part. As shown in FIG. 1, the sun gear 11 has a journal part 14 at the circumference wall part, located opposite from the camshaft 2 through the drive side internal-gear part 12 in the axial direction.

The sprocket 13 has a based cylindrical shape, and is coaxially screwed to the sun gear 11 from a specific side adjacent to the camshaft 2 in the axial direction. The sprocket 13 is coaxially arranged on the radially outer side of the camshaft 2 having a cylindrical shape and made of metal. An inner circumference surface 13b of a bottom wall part of the sprocket 13 is slidably fitted to the outer circumference surface 2a of the camshaft 2, such that a radial bearing is defined by the camshaft 2 from the inner side in the radial direction. Moreover, the sprocket 13 has a protruding part 18 projected to an opposite-to-specific side which is opposite from the camshaft 2 in the axial direction. The protruding part 18 continues to extend in the circumferential direction to have a ring shape having the same axis as the bottom wall part. In this embodiment, the protruding part 18 has a trapezoid shape in the cross-section, and has a flat tip end surface 18c on the opposite-to-specific side.

The sprocket 13 has plural sprocket teeth 19 on the outer circumference surface of the circumference wall part. The sprocket teeth 19 are projected outward in the radial direction, and are arranged in the circumferential direction with a regular interval. A timing chain (not shown) is disposed between the sprocket teeth 19 of the sprocket 13 and plural sprocket teeth of the crankshaft, such that the sprocket 13 and the crankshaft are engaged with each other. A crank torque outputted from the crankshaft is transmitted to the sprocket 13 through the timing chain. As the result, the driving rotor 10 is rotated with the crankshaft in a fixed direction (counterclockwise in FIG. 2, and clockwise in FIG. 3) while the driving rotor 10 is supported in the radial direction as the radial bearing by the camshaft 2.

The sun bearing 15 having a circular shape and made of metal is coaxially arranged on the radially inner side of the journal part 14. The sun bearing 15 has an outer ring 15a, an inner ring 15b, and a spherical rolling element 15c. The sun bearing 15 is a single sequence type radial bearing in which one row of spherical rolling elements 15c are arranged between the outer ring 15a and the inner ring 15b. The sun bearing 15 is an open type deep groove ball bearing in this embodiment. The outer ring 15a is coaxially press-fitted to the inner circumference surface 14a of the journal part 14, such that outer ring 15a is held by the journal 14 from the outer side in the radial direction.

As shown in FIGS. 1 and 3, the driven rotor 20 having a based cylindrical shape and made of metal is coaxially arranged on the radially inner side of the sprocket 13, such that the driven rotor 20 supports the driving rotor 10 in the radial direction as a radial bearing. In this embodiment, the circumference wall part of the driven rotor 20 has an outer circumference surface 20a adjacent to the bottom wall, and the circumference wall part of the sprocket 13 has an inner circumference surface 13a adjacent to the bottom wall. The outer circumference surface 20a is slidably fitted with the inner circumference surface 13a, such that the driving rotor 10 is supported from the radially inner side.

Figure 7:
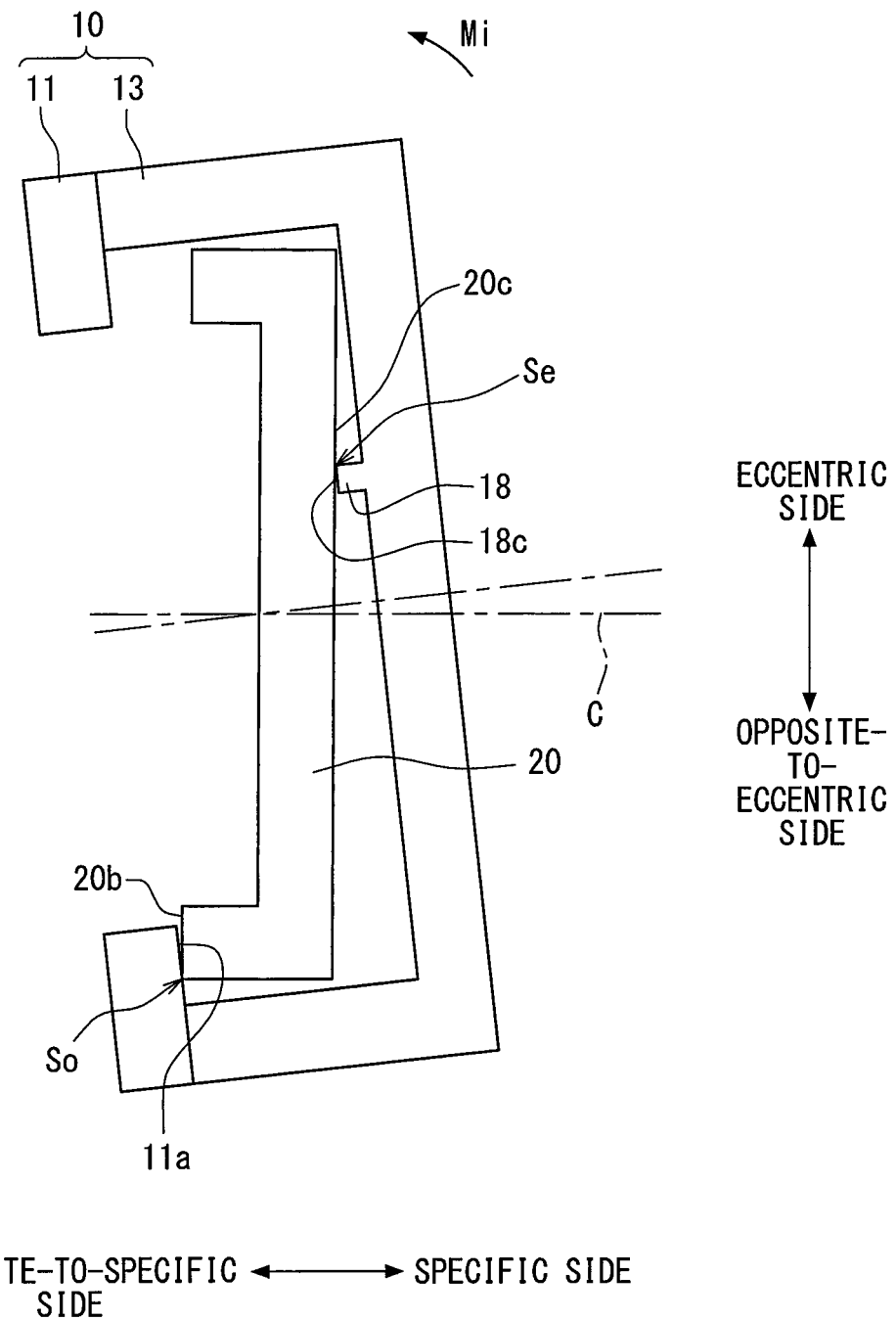
FIG. 7 is a diagram illustrating an inclination state of a drive rotor of FIG. 4 in exaggerated manner.

As shown in FIGS. 1 and 7, the driven rotor 20 is interposed between the sun gear 11 and the sprocket 13 in the axial direction, and supports the driving rotor 10 on both sides in the axial direction as a thrust bearing. Specifically, an opening end surface 20b of the circumference wall part of the driven rotor 20 is in contact with a large diameter side end surface 11a of the circumference wall part of the sun gear 11. Thereby, the driven rotor 20 supports the driving rotor 10 from the specific side in the axial direction as a thrust bearing. On the other hand, an outer end surface 20c of the bottom wall part of the driven rotor 20 is in contact with the tip end surface 18c of the protruding part 18 defined in the bottom wall part of the sprocket 13. Thereby, the driven rotor 20 supports the driving rotor 10 from the opposite-to-specific side in the axial direction as a thrust bearing.

In this embodiment, the distance between the end surface 11a of the driving rotor 10 and the end surface 18c in the axial direction is set larger than the thickness of the driven rotor 20 between the end surface 11a and the end surface 18c in the axial direction by only a set amount. Thereby, the driving rotor 10 can be inclined to the driven rotor 20, as shown in FIG. 7.

As shown in FIGS. 1 and 3, the driven rotor 20 has a connection part 22 at the bottom wall part to be connected with the camshaft 2 coaxially. The driven rotor 20 rotating in the same direction (clockwise in FIG. 3) can rotate relative to the driving rotor 10 under the state where the driven rotor 20 supports the driving rotor 10 on the both sides in the axial direction as a thrust bearing and from the inner side in the radial direction as a radial bearing.

The driven rotor 20 has a driven side internal-gear part 24 with a tip circle on the radially inner side of a root circle at the circumference wall part. The driven side internal-gear part 24 is arranged offset relative to the drive side internal-gear part 12 to the specific side in the axial direction, not to overlap in the radial direction. The inside diameter of the driven side internal-gear part 24 is set smaller than the inside diameter of the drive side internal-gear part 12. The number of teeth of the driven side internal-gear part 24 is set less than the number of teeth of the drive side internal-gear part 12.

As shown in FIGS. 1-3, the planetary rotor 30 having a disk shape, as a whole, made of metal is arranged eccentric to the rotors 10 and 20. The planetary rotor 30 has a planetary gear 31 and a planetary bearing 36.

The planetary gear 31 made of metal and having a ring shape with a projection is arranged to extend from the radially inner side of the driven side internal-gear part 24 to the radially inner side of the drive side internal-gear part 12. The planetary gear 31 is eccentric to the rotation center line C of the driven rotor 20 in the radial direction.

The planetary gear 31 has external-gear parts 32, 34 with a tip circle on the radially outer side of a root circle, at the circumference wall part. The drive side external-gear part 32 is engaged with the drive side internal-gear part 12 from the radially inner side on the eccentric side eccentric to the rotors 10 and 20 (hereafter referred to "the eccentric side"). The driven side external-gear part 34 is formed at a position not overlapping with the drive side external-gear part 32 in the radial direction, as the driven side external-gear part 34 is offset to the specific side in the axial direction relative to the drive side external-gear part 32. The outer diameter of the driven side external-gear part 34 is different from that of the drive side external-gear part 32, and is smaller than the outer diameter of the drive side external-gear part 32. The number of teeth of the driven side external-gear part 34 is set less than the number of teeth of the drive side external-gear part 32. The driven side external-gear part 34 is engaged with the driven side internal-gear part 24 from the radially inner side on the eccentric side.

As shown in FIG. 1, the planetary gear 31 is supported by the driven rotor 20 from the specific side in the axial direction as a thrust bearing. Specifically, a connection end surface 32a of the drive side external-gear part 32 of the planetary gear 31 that is connected with the driven side external-gear part 34 is in contact with the opening end surface 20b of the driven rotor 20 in the axial direction. Thereby, the driven rotor 20 supports the planetary gear 31 from the specific side as a thrust bearing.

As shown in FIGS. 1-3, the planetary bearing 36 is arranged to extend from the radially inner side of the drive side external-gear part 32 to the radially inner side of the driven side external-gear part 34. The planetary bearing 36 is made of metal, and has a circular shape. The planetary bearing 36 is eccentric to the rotation center line C of the driven rotor 20 in the radial direction that is the same as the planetary gear 31. The planetary bearing 36 has an outer ring 36a, an inner ring 36b, and a spherical rolling element 36c. The planetary bearing 36 is a single sequence type radial bearing in which one row of spherical rolling elements 36c is interposed between the outer ring 36a and the inner ring 36b. In this embodiment, the planetary bearing 36 is an open type deep groove ball bearing. The outer ring 36a is coaxially press-fitted to the inner circumference surface 31a of the planetary gear 31, such the planetary bearing 36 is held from the radially outer side by the planetary gear 31.

The planetary carrier 50 is made of metal, and has a partially-eccentric cylindrical shape. The planetary carrier 50 is arranged to extend from the radially inner side of the planetary rotor 30 to the radially inner side of the journal part 14. The planetary carrier 50 has an input unit 51 having a cylindrical surface coaxial with the rotors 10 and 20 and the control shaft 6. The input unit 51 is formed on the inner circumference surface of the circumference wall part. The input unit 51 has a connection slot 52 fitted to a joint 53, and the control shaft 6 is connected with the planetary carrier 50 through the joint 53, such that the planetary carrier 50 can rotate integrally with the control shaft 6.

As shown in FIG. 1, the planetary carrier 50 has a coaxial part 56 on the outer circumference surface of the circumference wall part. The coaxial part 56 has a cylindrical surface coaxial with the rotors 10 and 20. The coaxial part 56 is coaxially fitted to the inner ring 15b of the sun bearing 15, and supports the driving rotor 10 from the radially inner side as a radial bearing. Under this bearing situation, the planetary carrier 50 can rotate relative to the rotors 10 and 20, while coaxially rotating.

As shown in FIGS. 1-3, the planetary carrier 50 has an eccentric part 54 having a cylindrical surface shape eccentric to the rotors 10, 20, on the outer circumference surface of the circumference wall part, on the specific side than the coaxial part 56. The eccentric part 54 is eccentric, with respect to the rotation center line C of the driven rotor 20, in the radial direction that is the same as the planetary gear 31 and the planetary bearing 36. The eccentric part 54 is coaxially fitted to the inner ring 36b of the planetary bearing 36, and supports the planetary rotor 30 from the radially inner side as a radial bearing. Under this bearing state, the planetary carrier 50 causes the planetary movement of at least the planetary gear 31 of the planetary rotor 30 according to the relative rotation to the driving rotor 10. At this time, the planetary gear 31 rotating in the own circumferential direction revolves in the rotating direction of the planetary carrier 50 under a gear engagement state where engaged with the rotors 10 and 20 on the eccentric side.

The elastic component 60 made of metal is received in a concave portion 55 opened at two positions in the circumferential direction of the eccentric part 54. The elastic component 60 is a board spring having approximately U-shape in the cross-section. The elastic component 60 is interposed between the inner ring 36b of the planetary bearing 36 of the planetary rotor 30 and the concave portion 55. The elastic component 60 is compressed in the radial direction of the planetary rotor 30, and is elastically deformed, such that the restoring force is generated.

Figure 6:
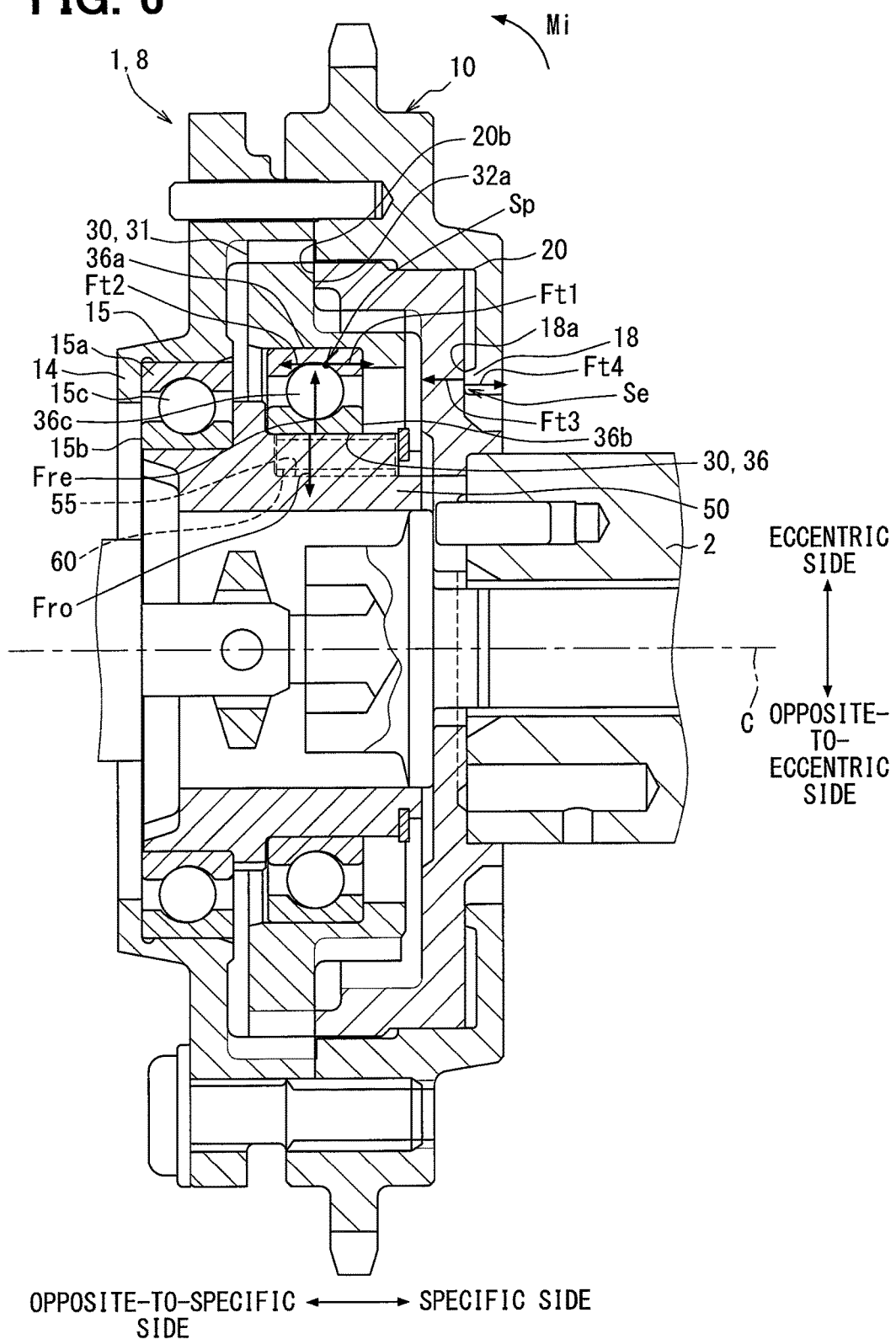
FIG. 6 is a diagram illustrating correlation of thrust forces, corresponding to FIG. 4.

As shown in FIGS. 2 and 3, a base line B is assumed to extend straight along with the radial direction in which the planetary rotor 30 is eccentric. The elastic component 60 is arranged at symmetry positions about the base line B in an arbitrary range in the axial direction. As a result, as shown in FIG. 6, a radial force Fro acting on the planetary carrier 50 is generated on a side opposite from the eccentric side (hereafter referred to "the opposite-to-eccentric side") along the base line B as a total force of the restoring forces of the elastic components 60. Further, as shown in FIG. 6, a radial force Fre acting on the inner ring 36b of the planetary rotor 30 is generated on the eccentric side along the base line B of FIGS. 2 and 3 as the a total force. In this way, while each elastic component 60 is held in the concave portion 55, the planetary rotor 30 is biased by the radial force Fre received at the inner ring 36b, such that the engagement state of the rotors 10 and 20 can be maintained.

The phase adjustment unit 8 controls the rotation phase between the driving rotor 10 and the driven rotor 20 according to the rotation state of the control shaft 6, such that the valve timing can be controlled suitably for the operation situation of the internal combustion engine.

Specifically, when the planetary carrier 50 does not carry out relative rotation to the rotor 10, the control shaft 6 rotates at the same speed as the driving rotor 10, and the planetary rotor 30 does not carry out planetary movement and rotates with the rotors 10 and 20. As a result, the rotation phase is substantially the same, and the valve timing is maintained. When the planetary carrier 50 carries out relative rotation in the retard direction to the rotor 10, the control shaft 6 rotates at a low speed or in an opposite direction to the driving rotor 10, and the driven rotor 20 will carry out relative rotation in the retard direction to the driving rotor 10 by planetary movement of at least the planetary gear 31 of the planetary rotor 30. As a result, the rotation phase is retarded to retard the valve timing. When the planetary carrier 50 carries out relative rotation in the advance direction to the rotor 10, the control shaft 6 rotates at a speed higher than the driving rotor 10, and the driven rotor 20 will carry out relative rotation in the advance direction to the driving rotor 10 by planetary movement of at least the planetary gear 31 of the planetary rotor 30. As a result, the rotation phase is advanced to advance the valve timing.

(Detailed Configuration of Phase Adjustment Unit)

Figure 4:
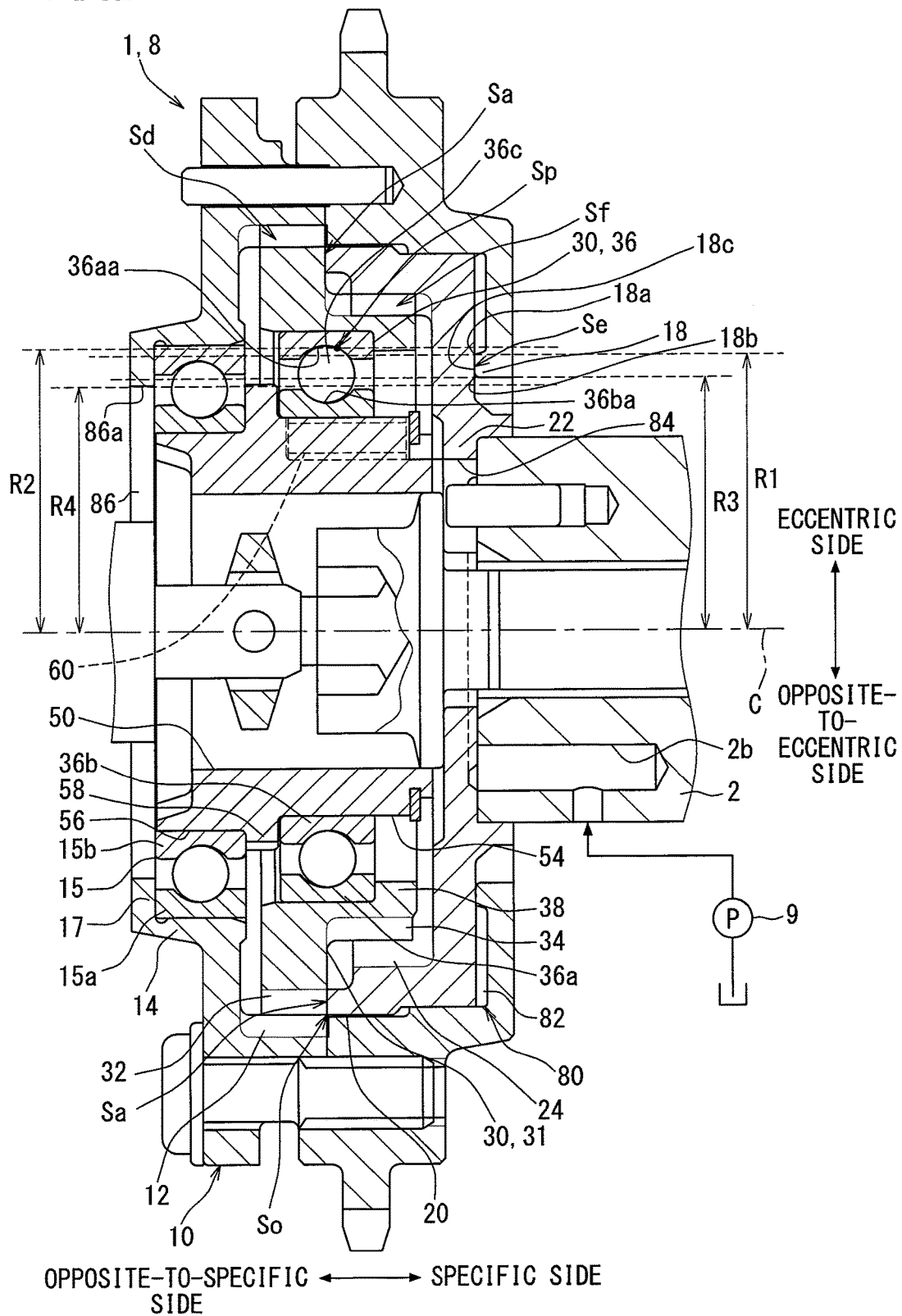
FIG. 4 is an enlarged cross-sectional view taken along a line IV-IV of FIG. 2.

As shown in FIGS. 1 and 4, in the phase adjustment unit 8, the outer ring 36a of the planetary bearing 36 forms an outer ring raceway groove 36aa having an arc shape in the cross-section symmetrical in the axial direction, due to the circular slot recessed outward in the radial direction and continuing in the circumferential direction. Moreover, the inner ring 36b of the planetary bearing 36 forms an inner ring raceway groove 36ba having an arc shape in the cross-section symmetrical in the axial direction, due to a circular slot recessed inward in the radial direction and continuing in the circumferential direction. Each of the outer ring raceway groove 36aa and the inner ring raceway groove 36ba is in rolling contact with the outer circumference surface of each spherical rolling element 36c arranged between the outer ring raceway groove 36aa and the inner ring raceway groove 36ba.

Figure 5:
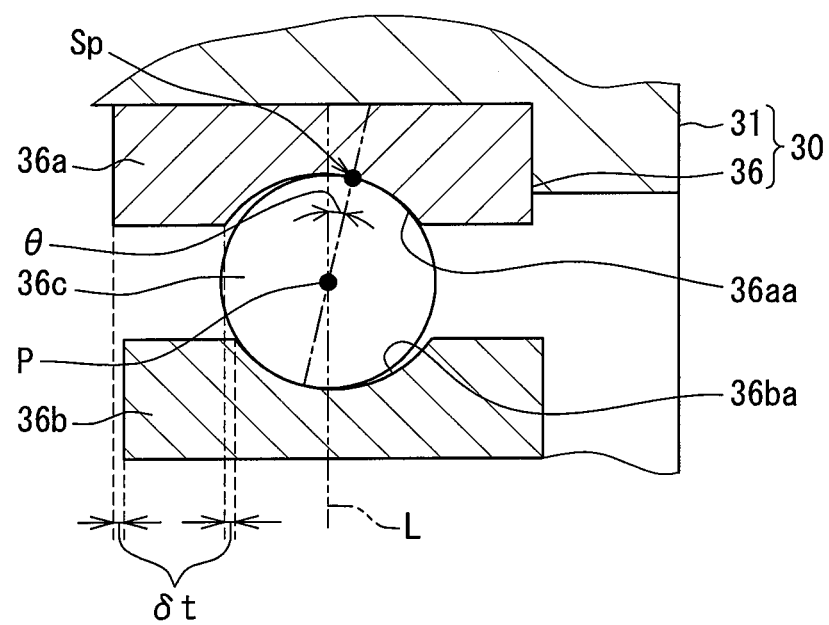
FIG. 5 is a diagram corresponding to a further enlarged view of FIG. 4.

As shown in FIG. 5, the axial length is substantially the same between the outer ring 36a and the inner ring 36b. The outer ring 36a has the raceway groove 36aa at the central part in the axial direction. The inner ring 36b has the raceway groove 36ba at the central part in the axial direction. Meanwhile, the outer ring raceway groove 36aa and the inner ring raceway groove 36ba are arranged offset from each other by a predetermined dimension δt in the axial direction, for example, by flash ground processing. Thereby, the outer ring raceway groove 36aa and the inner ring raceway groove 36ba are shifted from each other in the axial direction, by only the predetermined quantity δt within the range where partially overlapping in the radial direction. In this embodiment, the outer ring 36a is offset to the opposite-to-specific side relative to the inner ring 36b. Thereby, the outer ring raceway groove 36aa is offset to the opposite-to-specific side relative to the inner ring raceway groove 36ba.

Under this situation, a contact angle θ is defined, on the specific side in the axial direction, at the rolling contact part Sp where the outer ring raceway groove 36aa is in rolling contact with each spherical rolling element 36c, relative to a radial line L assumed to extend in the radial direction and to pass through the central point P of each spherical rolling element 36c. Therefore, as shown in FIG. 4 which is a longitudinal sectional view taken along the base line B (refer to FIGS. 2 and 3), the outer ring 36a is able to form the rolling contact part Sp in the rolling contact with the spherical rolling element 36c, on the eccentric side, with the contact angle θ to the specific side.

On the specific side than the rolling contact part Sp, as shown in FIG. 4, the outer ring 36a is engaged, from the specific side, with an inner flange part 38 having a ring board shape projected inward in the radial direction from the driven side external-gear part 34 in the planetary gear 31 throughout the circumferential direction. On the opposite-to-specific side than the rolling contact part Sp, the inner ring 36b is engaged, from the opposite-to-specific side, with an outer flange part 58 having a ring board shape projected outward in the radial direction from the planetary carrier 50 at a position between the coaxial part 56 and the eccentric parts 54 throughout the circumferential direction. Moreover, on the opposite-to-specific side, the outer flange part 58 is engaged, from the opposite-to-specific side, by the inner ring 15b of the sun bearing 15 throughout the circumferential direction. Furthermore, on the opposite-to-specific side, the outer ring 15a of the sun bearing 15 is engaged, from the opposite-to-specific side, by the inner flange part 17 having a ring board shape projected inward in the radial direction in the journal 14 of the driving rotor 10 throughout the circumferential direction.

Furthermore, in the driving rotor 10, the outermost circumference part 18a of the tip end surface 18c of the protruding part 18, which defines the thrust-bearing part Se by the driven rotor 20 on the specific side, is located closer to the rotation center line C of the driven rotor 20 than the rolling contact part Sp is, on the eccentric side. That is, a distance R1 in the radial direction from the rotation center line C to the outermost circumference part 18a on the eccentric side is set smaller than a distance R2 in the radial direction from the line C to the rolling contact part Sp on the eccentric side. In addition, when a radial clearance between the deepest part of the outer ring raceway groove 36aa and the spherical rolling element 36c is set to ΔR, when a distance in the radial direction from the rotation center line C to the deepest part is set to Ro, and when the diameter of the spherical rolling element 36c is set to Rb, the distance R2 in the radial direction can be calculated by the following formula 1. Moreover, on the opposite-to-eccentric side, the outermost circumference part 18a of the protruding part 18 is located far from the rotation center line C than the rolling contact part Sp is.

$$R2 = Ro - \Delta R - Rb(1 - \cos \theta) \quad \text{(formula 1)}$$

As shown in FIGS. 1 and 4, the device 1 includes a lubricous structure 80 in order to lubricate the phase adjustment unit 8 using lubricating oil introduced from the internal combustion engine as "lubricant." The lubricous structure 80 includes a lubricous chamber 82, a feed port 84, and a discharge port 86.

As shown in FIG. 4, the lubricous chamber 82 is formed of the interior space of the driving rotor 10. The lubricous chamber 82 includes, as a friction generating part, each engagement part Sd, Sf between the internal-gear part 12, 24 and the external-gear part 32, 34, each thrust-bearing part Se, So, Sa of the driving rotor 10 and the planetary gear 31 by the driven rotor 20, and the rolling contact part (including the part Sp) of the bearing 36, 15. The feed port 84 is formed by a through hole passing through the connection part 22 to communicate with the lubricous chamber 82, at the inner side of the protruding part 18 in the radial direction. The feed port 84 is communicated with a discharge port of a mechanical pump 9 driven by the crank torque of the crankshaft in the internal combustion engine through an introductory passage 2b of the camshaft 2. The lubricating oil breathed out to the introductory passage 2b from the mechanical pump 9 is introduced to the lubricous chamber 82 through the feed port 84 during operation of the internal combustion engine. As the result, lubricating oil is supplied to each friction generating part one by one in the lubricous chamber 82.

The discharge port 86 is formed of a center hole coaxially passing through the inner flange part 17 of the journal 14 to communicate the lubricous chamber 82 with the exterior. The discharge port 86 discharges the lubricating oil lubricating and passing each friction generating part in the lubricous chamber 82 to the exterior. Here, the innermost circumference part 18b of the tip end surface 18c of the protruding part 18 is located far from the rotation center line C of the driven rotor 20 than the inner circumference surface 86a of the discharge port 86 is, throughout the circumferential direction including the thrust-bearing part Se on the specific side and on the eccentric side. That is, a distance R3 in the radial direction from the rotation center line C to the innermost circumference part 18b is set larger than a distance R4 in the radial direction from the line C to the inner circumference surface 86a throughout the circumferential direction including the eccentric side.

(Correlation of Thrust Forces in Phase Adjustment Unit)

A correlation of thrust forces generated in the phase adjustment unit 8 is hereafter explained based on FIG. 6.

In the planetary bearing 36, a thrust force component Ft1 by which the spherical rolling element 36c presses the outer ring 36a to the specific side in response to the contact angle θ (refer to FIG. 5) is generated at the rolling contact part Sp on the eccentric side, due to the radial force Fre which is a resultant of the restoring forces of the elastic components 60. The thrust force component Ft1 is transmitted to the planetary gear 31 which fixes the outer ring 36a from the specific side. As a result, in the planetary gear 31 holding the outer ring 36a from the outer side in the radial direction, the connection end surface 32a continuously defines the contact part in contact with the opening end surface 20b of the driven rotor 20 in the circumferential direction. Thereby, the driven rotor 20 can support the planetary gear 31 from the specific side as a thrust bearing throughout the circumferential direction including both of the eccentric side and the opposite-to-eccentric side.

A thrust reaction force Ft2 by which the outer ring 36a presses the spherical rolling element 36c to the opposite-to-specific side is generated at the rolling contact part Sp on the eccentric side as a reaction force of the thrust force component Ft1. The thrust reaction force Ft2 is transmitted from the spherical rolling element 36c to the inner ring 36b in the planetary bearing 36, and is transmitted also to the planetary carrier 50 which fixes the inner ring 36b from the opposite-to-specific side. Furthermore, in the sun bearing 15, the thrust reaction force Ft2 is transmitted from the inner ring 15b which fixes the planetary carrier 50 through the spherical rolling element 15c to the outer ring 15a which fixes the journal 14. In this way, the thrust reaction force Ft2 which acts on the driving rotor 10 produces a thrust force Ft3 by which the driving rotor 10 presses the driven rotor 20 to the opposite-to-specific side, at the thrust-bearing part Se on the specific side and on the eccentric side. Furthermore, a thrust reaction force Ft4 by which the driven rotor 20 presses the driving rotor 10 to the specific side is generated as a reaction force of the thrust force Ft3 at the thrust-bearing part Se on the specific side and on the eccentric side.

Among the forces Ft1, Ft2, Ft3, and Ft4, the forces Ft1 and Ft3 acting on the driven rotor 20 indirectly through the planetary gear 31 or directly are supported with the camshaft 2 connected to the driven rotor 20. On the other hand, among the forces Ft1, Ft2, Ft3, and Ft4, the forces Ft4 and Ft2 acting on the driving rotor 10 indirectly through the planetary bearing 36 and the planetary carrier 50 or directly produce an inclination moment Mi which makes the driving rotor 10 inclined to the driven rotor 20. This is because the thrust-bearing part Se on the specific side is located closer to the rotation center line C of the driven rotor 20 than the rolling contact part Sp is, on the eccentric side where the position of the outermost circumference part 18a of the protruding part 18 is set as described above. That is, the thrust-bearing part Se which is an action point of the force Ft4 is located closer to the rotation center line C than the rolling contact part Sp which is an action point of the force Ft2. Therefore, the inclination moment Mi is generated counterclockwise of FIG. 6 to the driving rotor 10 which receives the forces Ft4 and Ft2.

The driving rotor 10 is inclined to the driven rotor 20 typically shown in FIG. 7 due to the inclination moment Mi. At this time, the driving rotor 10 increases the pressure to the driven rotor 20 at each of the thrust-bearing part Se on the specific side and on the eccentric side and the thrust-bearing part So on the opposite-to-specific side and the opposite-to-eccentric side. At this time, the driving rotor 10 inclines integrally with the inner ring 36b of the planetary bearing 36, and the planetary carrier 50, although the illustration is omitted.

(Action and Effect)

According to the device 1, the outer ring 36a of the single sequence type planetary bearing 36 in the planetary rotor 30 is held by the planetary gear 31 engaged with the driving rotor 10 and the driven rotor 20 on the eccentric side. Here, the inner ring 36b of the planetary bearing 36 supported by the planetary carrier 50 as a radial bearing receives the resultant of the restoring forces from the elastic components 60 to the eccentric side. Furthermore, while the spherical rolling elements 36c are interposed between the inner ring 36b and the outer ring 36a, the outer ring 36a of the planetary bearing 36 is arranged to form the rolling contact part Sp in rolling contact with the spherical rolling element 36c on the eccentric side with the contact angle θ to the specific side in the axial direction.

The thrust force component Ft1 of the resultant of the restoring forces by which the spherical rolling element 36c presses the outer ring 36a to the specific side in response to the contact angle θ produces the thrust reaction force Ft2 by which the outer ring 36a presses the spherical rolling element 36c to the opposite-to-specific side, at the rolling contact part Sp on the eccentric side while the device 1 is configured as such. The opposite-to-specific side thrust reaction force Ft2 is transmitted from the spherical rolling element 36c to the inner ring 36b and the planetary carrier 50, and acts on the driving rotor 10 supporting the planetary carrier 50 in the radial direction. Therefore, at the thrust-bearing part Se on the specific side and on the eccentric side where the driving rotor 10 is supported as a thrust bearing by the driven rotor 20, the driving rotor 10 presses the driven rotor 20 to the opposite-to-specific side, such that the thrust reaction force Ft4 is generated to press the driving rotor 10 to the specific side by the driven rotor 20.

According to the device 1, the thrust-bearing part Se which is the acting point of the specific side thrust reaction force Ft4 is located closer to the rotation center line C of the driven rotor 20 than the rolling contact part Sp which is the acting point of the opposite-to-specific side thrust reaction force Ft2. As a result, the driving rotor 10 which receives the specific side thrust reaction force Ft4 and the opposite-to-specific side thrust reaction force Ft2 is inclined to the driven rotor 20 integrally with the inner ring 36b of the planetary bearing 36 and the planetary carrier 50. At this time, the driving rotor 10 inclines to increase the pressure to the driven rotor 20 at the thrust-bearing part Se on the specific side and on the eccentric side. This means that the driving rotor 10 can maintain the contact with the driven rotor 20 both sides in the axial direction by own inclination. Therefore, the driving rotor 10 can be restricted from moving to both sides in the axial direction to collide with the driven rotor 20 by this contact maintaining function due to the inclination. Since the sound caused by the collision can be reduced, it is possible to enhance the silence.

According to the device 1, the protruding part 18 projected in the axial direction in the inclinable driving rotor 10 defines the thrust-bearing part Se by contacting with the driven rotor 20. Thereby, the driving rotor 10 can certainly be inclined using the outermost circumference part 18a as a fulcrum, since the outermost circumference part 18a of the tip end surface 18c of the protruding part 18, at the thrust-bearing part Se on the specific side and on the eccentric side, is located closer to the rotation center line C than the rolling contact part Sp is. Therefore, the abnormal sound can be reduced by securing the inclination for making the driving rotor 10 to be in contact with the driven rotor 20 at both sides in the axial direction. Therefore, it becomes possible to certainty enhance the silence.

According to the device 1, the planetary gear 31 holding the outer ring 36a of the planetary bearing 36 is supported by the driven rotor 20 from the specific side, as the thrust bearing, both of the eccentric side and the opposite-to-eccentric side. Due to the thrust bearing on the both sides, it becomes difficult for the planetary gear 31 to be inclined while receiving the thrust force component Ft1 to the specific side through the outer ring 36a. Therefore, the opposite-to-specific side thrust reaction force Ft2 is certainly generated, by which the outer ring 36a presses the spherical rolling element 36c as a reaction over the specific side thrust part force Ft1. Accordingly, abnormal noise can be reduced by securing the inclination for making the driving rotor 10 to be in contact with the driven rotor 20 at the both sides in the axial direction. Therefore, it becomes possible to further enhance the silence.

According to the device 1, the lubricating oil lubricating the thrust-bearing part Se is introduced inside the driving rotor 10, and receives rotary centrifugal force. As the result, the lubricating oil is stored at a position far from the rotation center line C of the driven rotor 20 than the discharge port 86, inside the driving rotor 10. Therefore, at the thrust-bearing part Se located far from the rotation center line C of the driven rotor 20 than the discharge port 86 on the specific side and the eccentric side, the sliding interface between the driving rotor 10 and the driven rotor 20 can be lubricated by the lubricating oil stored inside of the driving rotor 10 where the thrust-bearing part Se is defined. Accordingly, the inclination angle of the driving rotor 10 to the driven rotor 20 can be restricted from becoming smaller than a predetermined angle, while at least one of the driving rotor 10 and the driven rotor 20 has sliding wear at the thrust-bearing part Se. As a result, abnormal noise can be continuously reduced by securing the inclination for making the driving rotor 10 to be in contact with the driven rotor 20 on both sides in the axial direction. Therefore, it is possible to raise the reliability of effect enhancing the silence.

According to the device 1, the protruding part 18 projected in the axial direction in the driving rotor 10 defines the thrust-bearing part Se by contacting with the driven rotor 20, and lubricating oil is introduced into the driving rotor 10. Thereby, since the innermost circumference part 18b of the tip end surface 18c of the protruding part 18 is located far from the rotation center line C than the discharge port 86, at the thrust-bearing part Se on the specific side and the eccentric side, the lubricating oil stored at the far place can lubricate the whole sliding interface between the protruding part 18 and the driven rotor 20. Therefore, sliding wear at the thrust-bearing part Se can be certainly restricted. Thus, abnormal noise can be reduced for a long time period by continuously securing the inclination for making the driving rotor 10 to be in contact with the driven rotor 20 on both sides in the axial direction. Therefore, it becomes possible to raise the certainty and reliability of effect enhancing the silence.

(Other Embodiment)

The present disclosure is not limited to the embodiment described, and can be applied to various embodiments within a range not deviated from the scope of the present disclosure.

Figure 8:
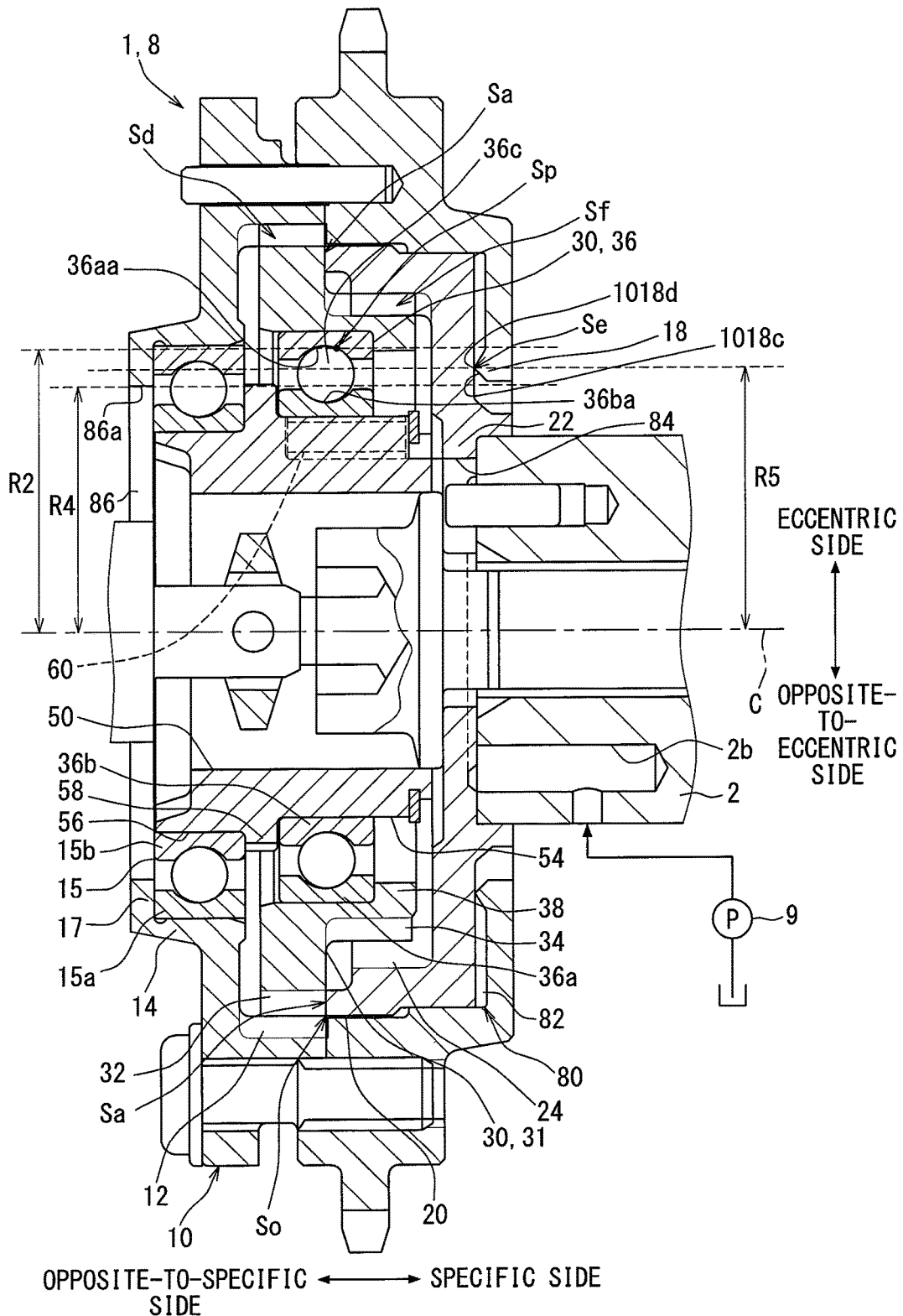
FIG. 8 is an enlarged cross-sectional view illustrating a modification in FIG. 4.

As shown in FIG. 8, as a first modification, the protruding part 18 is formed in triangle in the cross-section. A peak point 1018d of the tip end surface 1018c of the protruding part 18 may be located closer to the rotation center line C of the driven rotor 20 than the rolling contact part Sp is, on the eccentric side. Here, a distance R5 in the radial direction from the rotation center line C to the peak point 1018d, on the eccentric side, is set smaller than the distance R2 in the radial direction from the line C to the rolling contact part Sp, on the eccentric side. Thereby, the thrust-bearing part Se on the specific side and the eccentric side may be located closer to the rotation center line C than the rolling contact part Sp is. In addition, the same can be applied when the protruding part 18 is formed in semicircle shape in the cross-section, although the illustration is omitted.

As shown in FIG. 8, as a second modification, the protruding part 18 is formed in triangle in the cross-section. A peak point of the tip end surface 18c of the protruding part 18 may be located far from the rotation center line C of the driven rotor 20 than the discharge port 86 is, throughout the circumferential direction including the eccentric side. Here, the distance R5 in the radial direction from the rotation center line C to the peak point 1018d is set larger than the distance R4 in the radial direction from the line C to the inner circumference surface 86a of the discharge port 86 throughout the circumferential direction including the eccentric side. Thereby, the thrust-bearing part Se on the specific side and the eccentric side may be located far from the rotation center line C than the discharge port 86 is. In addition, the same can be applied when the protruding part 18 is formed in semicircle shape in the cross-section, although the illustration is omitted.

As a third modification, the thrust-bearing part Se on the specific side and the eccentric side may be located closer to the rotation center line C than the discharge port 86 is, or may be located at approximately the same distance as the discharge port 86. As a fourth modification, the driven rotor 20 may not support the connection end surface 32a of the planetary gear 31 as the thrust bearing, at least one of the eccentric side and the opposite-to-eccentric side.

Figure 9:
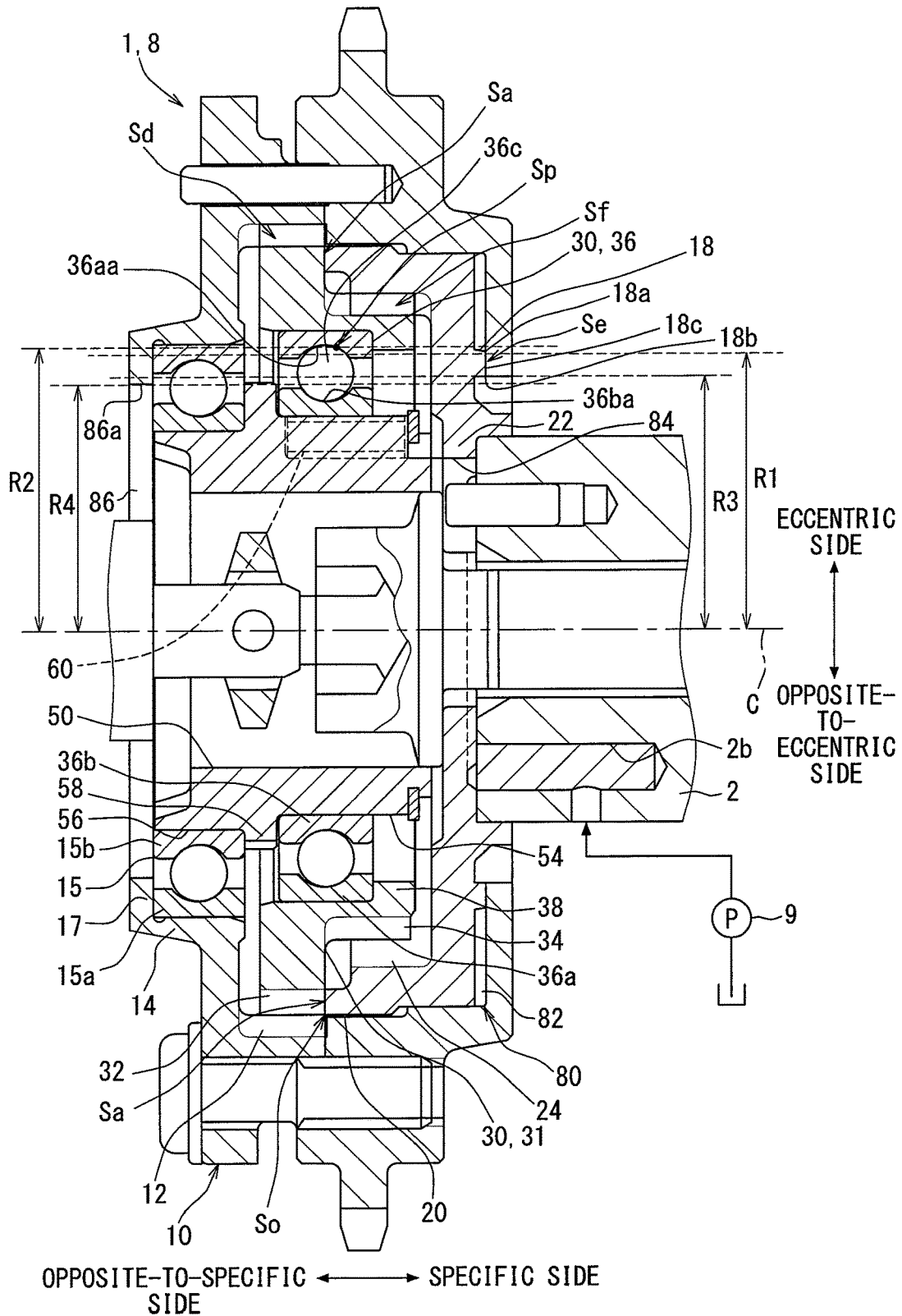
FIG. 9 is an enlarged cross-sectional view illustrating a modification in FIG. 4.

As shown in FIG. 9, as a fifth modification, the protruding part 18 is projected from the outer end surface 20c of the bottom wall part of the driven rotor 20 to the specific side. The tip end surface 18c of the protruding part 18 projected from the driven rotor 20 to the specific side is in contact with the inner bottom surface of the bottom wall part of the sprocket 13, to define the thrust-bearing part Se. Moreover, as a sixth modification, one elastic component 60 or three or more elastic components 60 may be provided at suitable positions between the planetary rotor 30 and the planetary carrier 50, while it is possible to generate the restoring force which biases the planetary rotor 30 to the eccentric side.

As a seventh modification, at least one of the flange parts 38, 58, and 17 may be omitted. Moreover, as an eighth modification, the present disclosure may be applied to a device which adjusts the valve timing of an exhaust valve as "valve", and a device which adjusts the valve timing of both of the intake valve and the exhaust valve as "valve."

The invention claimed is:

1. A valve timing adjustment device that adjusts valve timing of a valve opened and closed by a camshaft by a torque transfer from a crankshaft for an internal combustion engine, the valve timing adjustment device comprising:

a driving rotor that rotates with the crankshaft;

a driven rotor that rotates with the camshaft in a state where the driven rotor supports the driving rotor at both sides in an axial direction as a thrust bearing, and where the driven rotor supports the driving rotor from an inner side in a radial direction as a radial bearing, the driven rotor being connected coaxially with the camshaft;

a planetary rotor arranged eccentric to the driving rotor and the driven rotor, the planetary rotor controlling a rotation phase between the driving rotor and the driven rotor by carrying out planetary movement under a gear engagement state in which the planetary rotor is engaged with the driving rotor and the driven rotor from an inner side in the radial direction on the eccentric side;

a planetary carrier that causes the planetary movement of the planetary rotor under a state where the driving rotor is supported from the inner side in the radial direction, and where the planetary rotor is supported from the inner side in the radial direction; and a spring interposed between the planetary rotor and the planetary carrier to generate a restoring force biasing the planetary rotor to the eccentric side such that the driving rotor is inclined to the driven rotor, wherein the planetary rotor includes a planetary gear engaged with the driving rotor and the driven rotor on the eccentric side, and a single sequence planetary bearing having an outer ring held by the planetary gear, an inner ring supported by the planetary carrier in the radial direction and receiving the restoring force from the spring, and a plurality of spherical rolling elements interposed between the outer ring and the inner ring, the outer ring is arranged to form a rolling contact part in contact with the spherical rolling element on the eccentric side, with a contact angle to a specific side in the axial direction, and a thrust-bearing part, where the driving rotor is supported by the driven rotor on the specific side and on the eccentric side, is located closer to a rotation center line of the driven rotor than the rolling contact part is to the center line of the driven rotor.

2. The valve timing adjustment device according to claim 1, wherein the thrust-bearing part is defined by a protruding part projected in the axial direction from one of the driving rotor and the driven rotor that is in contact with the other of the driving rotor and the driven rotor, and the protruding part has a tip end surface, and an outermost circumference part of the tip end surface on the eccentric side, where the outermost circumference part of the tip end surface is located closer to the rotation center line of the driven rotor than the rolling contact part is to the rotation center line of the driven rotor.

3. The valve timing adjustment device according to claim 1, wherein the planetary gear is supported by the driven rotor from the specific side as the thrust bearing, at both of the eccentric side and an opposite-to-eccentric side opposite to the eccentric side.

4. The valve timing adjustment device according to claim 1, wherein the thrust-bearing part is located inside of the driving rotor, and lubricant lubricating the thrust-bearing part is introduced into the driving rotor, the driving rotor has a discharge port through which the lubricant is discharged to outside, and the thrust-bearing part on the specific side and the eccentric side is located farther from the rotation center line of the driven rotor than the discharge port is from the rotation center line of the driven rotor.

5. The valve timing adjustment device according to claim 4, wherein the thrust-bearing part is defined by a protruding part projected in the axial direction from one of the driving rotor and the driven rotor that is in contact with the other of the driving rotor and the driven rotor, and the protruding part has a tip end surface, and an innermost circumference part of the tip end surface is located farther from the rotation center line of the driven rotor throughout a circumferential direction than the discharge port is from the rotation center line of the driven rotor.

* * * * *